United States Patent [19]

Baugh

[11] Patent Number: 5,412,940

[45] Date of Patent: May 9, 1995

[54] HIGH PRESSURE EXHAUST CLEANING SYSTEM

[76] Inventor: Benton F. Baugh, 14626 Oak Bend, Houston, Tex. 77079

[21] Appl. No.: 190,860

[22] Filed: Feb. 3, 1994

[51] Int. Cl.[6] .............................................. F01N 3/20
[52] U.S. Cl. ................................ 60/274; 60/39.41; 60/281; 60/315
[58] Field of Search ............... 60/613, 614, 281, 315, 60/39.41, 274

[56] References Cited

U.S. PATENT DOCUMENTS

| | | | |
|---|---|---|---|
| 671,236 | 4/1901 | Renault | 60/281 |
| 2,392,711 | 4/1944 | Willenborg | 60/281 |
| 3,500,635 | 3/1970 | Roper | 60/281 |
| 3,939,656 | 2/1976 | Goldfein | 60/281 |
| 4,811,558 | 3/1989 | Baugh | 60/281 |

*Primary Examiner*—Ira S. Lazarus
*Assistant Examiner*—Daniel J. O'Connor

[57] ABSTRACT

A method for dehydrating and cleaning high pressure gases withdrawn from within the combustion chamber of an internal combustion engine including maintaining the gases at a high pressure and cooling the gases to cause condensation of water, entraining particulate matter in the water, and delivering the water to the normal exhaust system of the engine for disposal thru vaporization back to being exhaust gas.

18 Claims, 2 Drawing Sheets

HIGH PRESSURE EXHAUST CLEANING SYSTEM

BACKGROUND OF THE INVENTION

The field of this invention is the production of exhaust gases directly from the combustion chamber of internal combustion engines (especially diesel engines) for service as a nonflammable gas in the drilling and workover of oil and gas wells.

Nonflammable gases are used for a variety of applications in oil and gas wells including underbalanced drilling, geothermal drilling, lightening oil well fluids to initiate production, well cleaning, fracing and other well operations. These low cost nonflammable gases will have a variety of other applications in other markets such as purging lines, pigging pipelines, extinguishing fires, etc.

Historically, most of these operations have been done by an expensive cryogenic liquid nitrogen process. The proposed process have substantial economic and environmental advantages relative to the cryogenic nitrogen processes, however, the uses of internal combustion engine exhaust imposes certain requirements on the dehydration and cleaning of the gases.

SUMMARY OF THE INVENTION

The object of this invention is to provide means for the dehydration of gases extracted from the combustion chamber of internal combustion engines.

A second object of the present invention is remove particulate matter from the gases extracted from the combustion chamber of internal combustion engines.

A third object of the present invention is dispose of the water and particulate matter collected during the dehydration and cleaning processes of this invention.

DESCRIPTION OF THE PREFERRED EMBODIMENT

Figure 1:
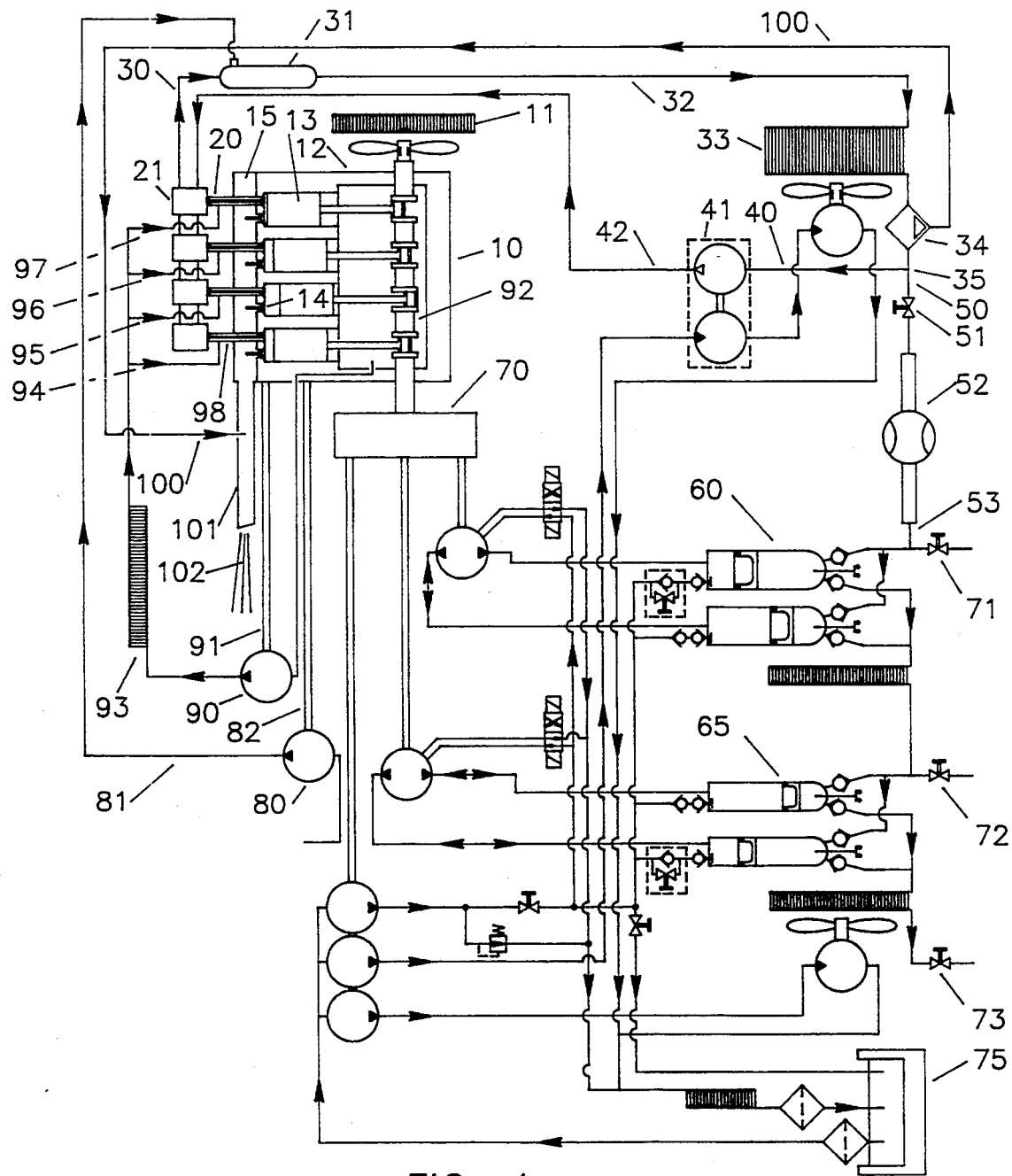
FIG. 1 is a an overall circuit drawing of a Baugas Service Gas System which incorporates and demonstrates the application of this invention.
Figure 2:
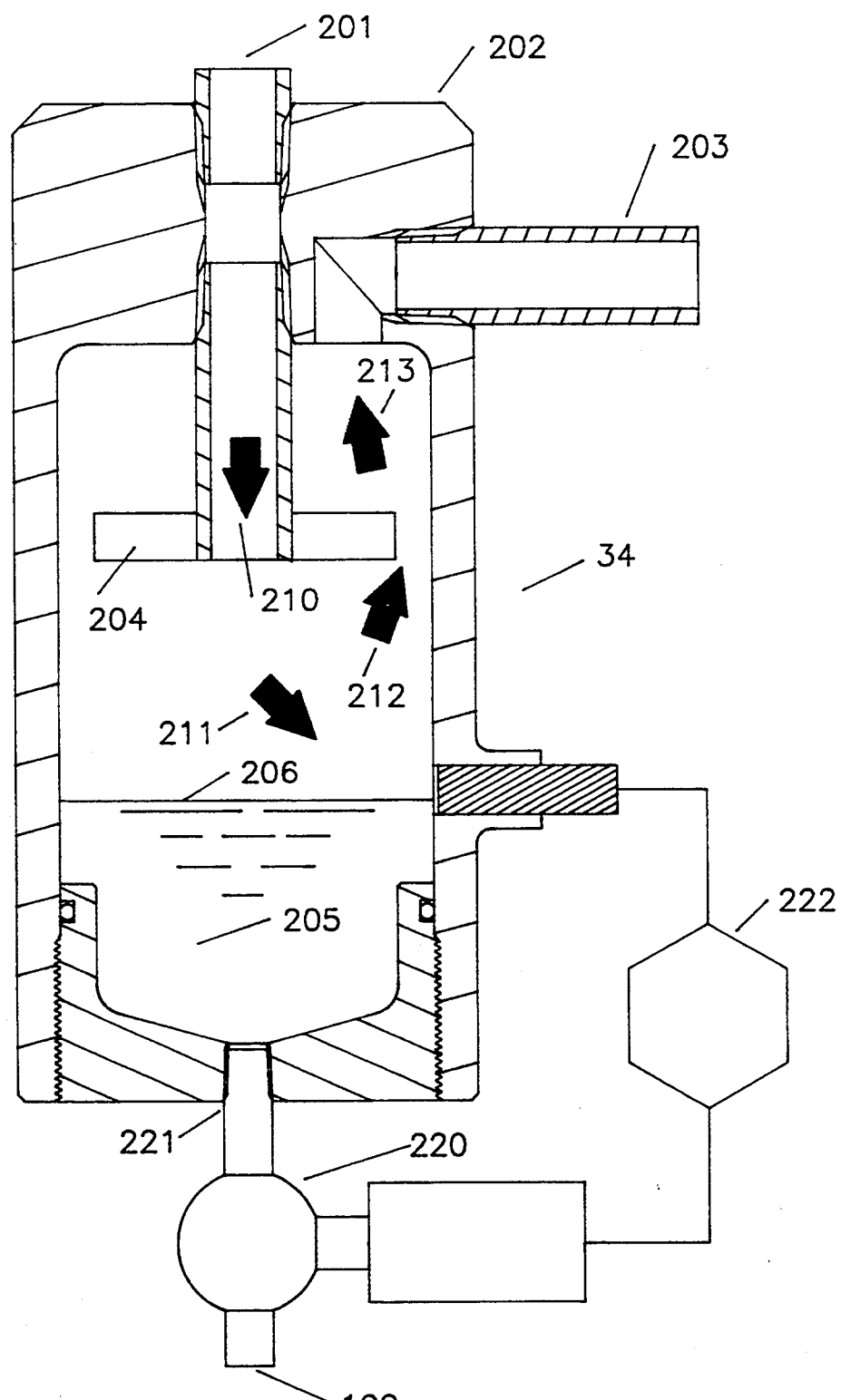
FIG. 2 is a half section drawing of a dehydrator/filter system and associated control means.

Referring now to FIG. 1, FIG. 1 is a an overall hydraulic circuit drawing of a service gas generation system which incorporates and demonstrates the application of this invention.

The system is built around a standard internal combustion engine 10, having a radiator 11, a block 12, pistons 13, valves 14, and a head 15. The engine can be a 2 cycle or 4 cycle engine, depending upon a variety of conditions. In this case some of the conventional exhaust valves 14 are replaced by riser tubes 20 which have extractor valves 21 installed on each of them.

During the normal compression cycle in the internal combustion engine the remaining exhaust valves 14 operate normally. The extractor valves 21 are manufactured to allow opening and production of some of the cylinder head gases past the extractor valve after the combustion has been initiated. During a portion of each rotation of the engine on 2 cycle engines or on every other rotation on a 4 cycle engine, hot gases will be produced past the valve means within the extractor valve assembly.

Produced gases are taken out line 30, thru converter 31, thru line 32, thru cooler 33, thru dehydrator/cleaner 34, and to the tee 35.

A portion of the cooled gases at tee 35 are taken thru line 40, thru recirculator pump 41, thru line 42, and back into the extractor valves 21. The constant recirculation caused by recirculator pump 41 causes cooled exhaust gases to be pumped across the extractor valves 21, giving a continuous cooling to the internal parts. Without the benefits of cooling techniques such as this, the temperatures of the high temperature produced gases are high enough to degrade the valve mechanisms.

The portion of the gases drawn off along line 50 from tee 35, thru control valve 51, thru flow rate meter 52, and along line 53 is the volume of gases delivered to the end user.

Secondary compressor system 60 and tertiary compressor system 65 utilize excess horsepower from the engine 10 thru the power takeoff assembly 70 to compress the produced gases to higher levels for various applications. For additional information on this compression process, refer to U.S. Pat. No. 5,276,838. Various service operations will require pressure as high as 5000 p.s.i. and 10,000 p.s.i. Produced gas can be taken thru outlet valves 71, 72, or 73, depending upon the secondary compression required for a particular application.

Fuel pump 80 draws fuel from the fuel tank used by engine 10 or from other fuel sources if a separate fuel or chemical injection is desired. This fuel is pumped along line 81 to converter 31. The fuel pump 80 is shown driven by shaft 82 off one of the drives on the rear of engine 10.

Oil pump 90 is shown driven by shaft 91 off one of the rear drives of engine 10 and drawing oil directly from the crankcase 92 of engine 10. The oil passes thru cooler 93, along lines 94–97 and into an annular circulation area 98 of the riser tubes 20. This oil serves to cool the riser tubes and then is vented into the head 15 of engine 10 and allowed to flow by gravity back to the crankcase 92.

Liquids separated from the produced gas by the dehydrator/cleaner 34 are taken by line 100 to the engine exhaust system 101 for revaporization as exhaust gas 102.

Now, referring to FIG. No. 2, the filter/dehydrator 34 has an inlet flow path 201, a body 202, an outlet 203, and gas swirling means 204. Collected liquids 205 which have condensed from the gases are shown up to a liquid level 206. In operation, the incoming gases, condensed liquids, and any particulate matter 210 would approach the condensed liquids 205 in the body 202 and turn sharply (arrow 211) to cause any liquids and any particulate matter to be entrained in the liquid 205.

Arrow 212 indicates the gases passing thru the swirling means 204 to assist in the cleaning and dehydration process and finally arrow 213 reflects cleaned and dehydrated gases approaching the outlet 203. The swirling action of the gas can be accomplished while travelling down, travelling up, or both; depending upon the particular application and equipment.

Control valve 220 attached to lower port 221 and controlled by controls circuitry 222 reflects a method for venting the liquids and entrained particulate matter into line 100 and thusly to exhaust system 101 as shown on FIG. No. 1. Upon entering the hot exhaust system 101 thru line 100, the liquids and entrained particulate matter will simply be revaporized and exit the system as exhaust gas 102.

Level sensing means 230 can be sonar or other means to determine when the level of the liquid has reached the maximum height desired and can signal the control valve 220 to open and exhaust some of the liquid. A likely type of level sensing means will be sonar, although floats and conductive sensors can work in some applications.

An alternate method which can be based upon experience will be to actuate the control valve 220 for a specific period of time on regular intervals. By this method, sensors prone to maintenance can simply be replaced by a simple timer.

The foregoing disclosure and description of this invention are illustrative and explanatory thereof, and various changes in the size, shape, and materials as well as the details of the illustrated construction may be made without departing from the spirit of the invention.

I claim:

1. A method for cleaning and dehydrating the high pressure gas mixture produced under pressure by the extraction of exhaust gas directly from the combustion chamber of an internal combustion engine, comprising
    maintaining said exhaust gas at said pressure and cooling said gases to a temperature at said pressure such that water vapor within said exhaust gas will condense into a liquid mixture,
    collecting said liquid mixture in a collection chamber and directing the flow of additional high pressure gas mixture toward said liquid mixture such that additional liquids and particulate matter within said additional high pressure gases will be entrained within said liquid mixture,
    actuating a valve means venting said liquid mixture out of said collection chamber,
    venting said liquid mixture at said pressure to the exhaust system of said internal combustion engine and allowing the heat of said exhaust system to revaporize said condensed water vapors as exhaust gases.

2. The invention of claim 1, wherein said actuating of said valve means is accomplished by timing which actuates said valve means for a controlled time period with a regular frequency.

3. The invention of claim 1, wherein said actuating of said valve means is accomplished by detecting the level of said liquids and actuating when the level of said liquids exceeds a predetermined level.

4. The invention of claim 3, wherein the detecting of said level of said liquids is accomplished by the movement of a float means.

5. The invention of claim 3, wherein the detecting of said level of said liquids is accomplished by sonar.

6. The invention of claim 3, wherein the detecting of said level of said liquids is accomplished by electrical resistivity.

7. The invention of claim 1, wherein said internal combustion engine is a diesel engine.

8. A method for cleaning and dehydrating the flow of the gas mixture produced by the extraction of exhaust gas from the combustion chamber of an combustion engine, comprising
    maintaining said gas mixture at a pressure and a temperature such that water vapor within said gas mixture will condense into a liquid,
    collecting said liquid in a collection chamber and directing the flow of said gas mixture toward said liquid such that additional liquids and particulate matter within said gas mixture will be entrained within said liquid,
    actuating a valve means venting said liquid out of said collection chamber,
    directing said liquid to the exhaust system of said combustion engine and allowing the heat of said exhaust system to revaporize said liquid as exhaust gases.

9. The invention of claim 8, wherein said actuating of said valve means is accomplished by timing which actuates said valve means for a controlled time period with a regular frequency.

10. The invention of claim 8, wherein said actuating of said valve means is accomplished by detecting the level of said liquids and actuating when the level of said liquids exceeds a predetermined level.

11. The invention of claim 10, wherein the detecting of said level of said liquids is accomplished by the movement of a float means.

12. The invention of claim 10, wherein the detecting of said level of said liquids is accomplished by sonar.

13. The invention of claim 10, wherein the detecting of said level of said liquids is accomplished by electrical resistivity.

14. The invention of claim 8, wherein said combustion engine is an internal combustion engine.

15. The invention of claim 14, wherein said internal combustion engine is a diesel engine.

16. The invention of claim 15, wherein said diesel engine is a two cycle diesel engine.

17. The invention of claim 8, wherein said combustion engine is a turbine.

18. The invention of claim 8, wherein said combustion engine is a jet engine.

* * * * *